May 6, 1941.          L. A. W. E. KEMP          2,240,700
MAGNETIC LENS SYSTEM
Filed Jan. 10, 1939
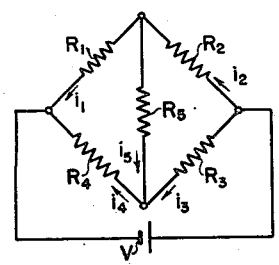
FIG.1.
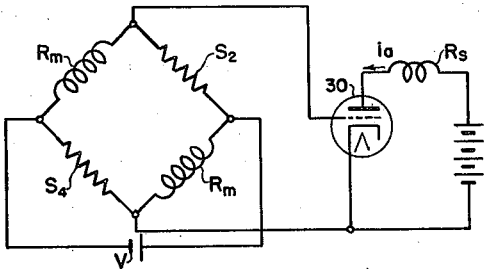
FIG.4.
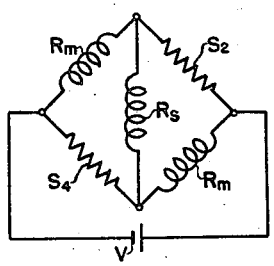
FIG.2.
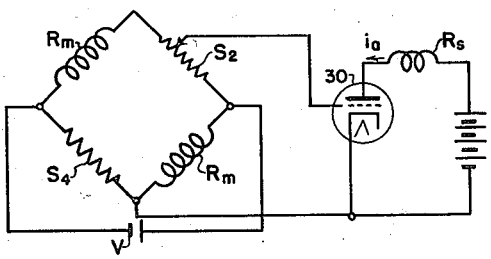
FIG.5.
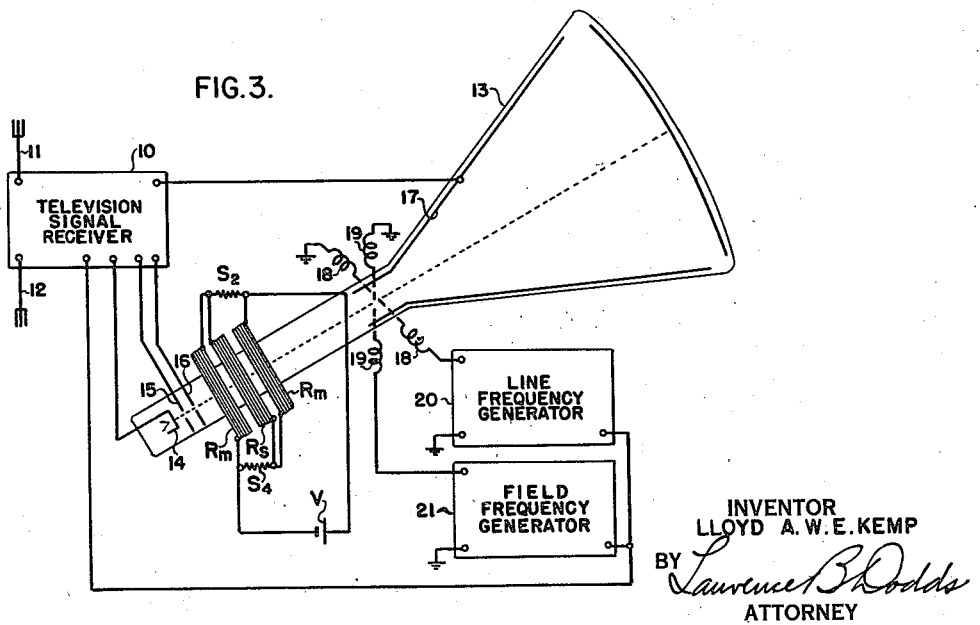
INVENTOR
LLOYD A. W. E. KEMP
BY Lawrence B. Dodds
ATTORNEY Patented May 6, 1941

2,240,700

UNITED STATES PATENT OFFICE 2,240,700

MAGNETIC LENS SYSTEM

Lloyd A. W. E. Kemp, Wembley, England, assignor to Hazeltine Corporation, a corporation of Delaware Application January 10, 1939, Serial No. 250,141
In Great Britain January 11, 1938

7 Claims. (Cl. 250—27)

This invention relates to a magnetic lens system for focusing an electron beam, and more particularly it relates to such apparatus suitable for application to a cathode-ray tube of television signal-translating apparatus.

The field-producing means used in magnetic lenses are often electromagnets with or without cores or shrouds of magnetic materials. The field strength of such lenses is usually adjusted by varying the exciting current. In practice, however, a single adjustment of the current is seldom sufficient. The passage of current through the winding of the electromagnet heats the winding and thereby changes its resistance to the current from a constant voltage supply; repeated readjustment is therefore necessary until a steady state has been reached.

It is, therefore, an object of the present invention to provide an improved magnetic lens which will overcome the above-mentioned disadvantages of the arrangements of the prior art.

It is another object of the invention to provide an electromagnetic lens having a relatively constant focusing field.

It is still another object of the invention to provide an electromagnetic lens which is automatically compensated for the effects of changes in temperature of the lens windings.

In accordance with the invention, a magnetic lens for focusing an electron beam of a cathode-ray tube comprises a first focusing winding having an axis adapted to be disposed generally parallel to the path of the electron beam and a second focusing winding substantially coaxial with said first winding. A Wheatstone resistance bridge circuit is provided, having a diagonal adapted to be coupled to a source of unidirectional potential, portions of the first winding of the magnetic lens being coupled in not more than two opposite arms of the bridge and the second winding being coupled in the diagonal of the bridge conjugate to the first-mentioned diagonal. The resistances of the arms of the bridge are so proportioned relative to the magnetic focusing fields of the first and second windings that the resultant field produced by both of the windings is substantially independent of changes of resistance of the first focusing winding due to changes in temperature or other causes.

For a better understanding of the invention together with other and further objects thereof, reference is had to the following description taken in connection with the accompanying drawing, and its scope will be pointed out in the appended claims.

In the accompanying drawing, Fig. 1 is an elementary circuit diagram of a Wheatstone bridge utilized to explain the theory of the invention; Fig. 2 is a schematic circuit diagram of an embodiment of the invention; Fig. 3 is a circuit diagram illustrating the application of the form of the invention of Fig. 2 to a television signal receiver; while Figs. 4 and 5 are modifications of the embodiment of the invention represented in Fig. 2.

The means for attaining the objects of the invention depends on the known fact that a Wheatstone bridge is a linear network so that, if the bridge is balanced so that there is no current in the diagonal and if the resistance in one arm is changed by an amount $\partial R$, the current in that arm and the current in the diagonal are both changed by amounts proportional to $\partial R$.

The magnetic field of the magnetic lens of the invention is produced by the cooperation of a first or main winding, producing a field $H_m$, and a second or subsidiary winding, producing a field $H_s$, the two windings being so related that the total effective field of the lens is $H_m + H_s$. Both $H_m$ and $H_s$ are, to a sufficient approximation, proportional to the currents $i_m$ and $i_s$ flowing, respectively, in the main winding and the subsidiary winding of the lens. It is assumed that, $$H_m = n_m i_m \text{ and } H_s = n_s i_s$$

where $n_m$ and $n_s$ are constants which can be given any desired values within limits by varying the number of turns of the windings and their relative position.

An exciting circuit for the electromagnet is provided such that the main winding constitutes one arm of a Wheatstone bridge and the subsidiary coil constitutes a diagonal of the bridge. The bridge is initially balanced so that no current flows in the diagonal in which the subsidiary winding is coupled. If the resistance of the main winding changes by $\partial R$, due to any cause such as heating, then, under the conditions assumed, $H_m$ changes by $n_m . \partial i_m / \partial R . \partial R$. Under these conditions, $H_s$ (previously zero under the condition of bridge balance) then becomes, $n_s . \partial i_s / \partial R . \partial R$. The total field $H_m + H_s$ is therefore unchanged if $$n_m . \partial i_m / \partial R + n_s . \partial i_s / \partial R = 0 \tag{1}$$

The terms "main" and "subsidiary" are used throughout the specification and claims merely for purposes of convenience in denoting particular windings in relation to their association as elements of the Wheatstone resistance bridge. The terms as so used do not necessarily bear any relation to the magnitudes of the fields produced by the windings nor does the term "main winding" specifically indicate the winding producing the larger field.

It is assumed that the other resistances in the bridge are substantially constant and, in particular, that the resistance of the diagonal in which the subsidiary winding is coupled is constant. There is no difficulty in approximating this last assumption for the current in the diagonal comprising the subsidiary winding is always small.

A conventional Wheatstone resistance bridge circuit is illustrated in Fig. 1. The arms of the bridge comprise resistances $R_1$, $R_2$, $R_3$, and $R_4$. One diagonal of the bridge is connected to a source of unidirectional potential V, and resistance $R_5$ is coupled across the conjugate bridge diagonal. The currents in the bridge circuit have been indicated by the arrows $i$, each having a subscript corresponding to the bridge resistance with which it is associated. The theory of the Wheatstone bridge is so well known that it is unnecessary to give detailed instructions for adjusting $n_m$, $n_s$ and the remaining resistances of the bridge so as to apply the above-mentioned principle. However, it may be stated that, using the notation of Fig. 1, if the bridge is initially balanced, and if a change occurs in the resistance $R_1$ only, then $$\frac{\partial i_1}{\partial R_1} = -V \frac{(R_2R_4+R_3R_4+R_3R_5+R_4R_5)\,(R_2R_3+R_2R_4+R_3R_4+R_3R_5+R_4R_5)}{[R_1R_3(R_2+R_4)+R_2R_4(R_1+R_3)+R_5(R_1+R_2)\,(R_3+R_4)]^2} \quad (2)$$

$$\left(\frac{\partial i_5}{\partial R_1}\right)_{i_5=0} = -V \frac{R_3}{R_1R_3(R_2+R_4)+R_2R_4(R_1+R_2)+R_5(R_1+R_2)\,(R_3+R_4)} \quad (3)$$

While it is possible, therefore, in accordance with the invention, to utilize one of the bridge arms of the circuit of Fig. 1 as the main winding of an electromagnetic lens comprising a subsidiary focusing winding inserted in arm $R_3$ and to proportion the parts according to the foregoing formulae, in practice it is usually convenient to divide the main winding of the lens of the invention into two similar parts, each of which is traversed by a current of the same value. Under these conditions, if $n_m$ is the value appropriate to one of the portions of the main winding, the condition corresponding to Equation 1 is:

$$2n_m.\partial i_n/\partial R + n_s.\partial i_s/\partial R = 0 \quad (4)$$

Preferably then the windings of the two parts of the main winding and of the subsidiary winding are arranged in the bridge circuit as shown in Fig. 2. The bridge circuit of Fig. 2 is similar to that of Fig. 1 except that it comprises the two parts of the main winding of the lens of the invention, each having a resistance $R_m$, as opposite arms of the bridge circuit and the subsidiary winding $R_s$ as the diagonal of the bridge circuit corresponding to $R_5$ of Fig. 1. $S_2$ and $S_4$ are constant resistances corresponding, respectively, to $R_2$ and $R_4$ of Fig. 1 and, for balance, having a resistance $R_m$. If $S_2$ and $S_4$ are constant, and if it is assumed that the same change $\partial R$ occurs always in the resistances of both windings $R_m$, the values of $\partial i_m/\partial R$ and $\partial i_s/\partial R$ are both twice as great as they would have been if the change had occurred in the resistance of one winding $R_m$ only, while their ratio is unchanged. Consequently the values to be inserted in Equation 4 can be derived from Equations 2 and 3 by putting $$R_1=R_2=R_3=R_4=R_m, \text{ and } R_5=R_s$$

The necessary condition is, $$n_s/n_m = -\frac{3R_m+R_s}{R_m} \quad (5)$$

Thus, by satisfying Equation 5 the resistances $S_2$ and $S_4$ of the arms of the bridge are so proportioned relative to the magnetic fields of the windings $R_m$, $R_m$ and $R_s$ that the resultant field produced by both of the windings is substantially independent of changes of resistance of the main focusing windings $R_m$, $R_m$.

Fig. 3 illustrates the application of the circuit of Fig. 2 to a modulated-carrier television receiver. The system comprises a television-signal receiver 10 including an antenna system 11, 12 to the output of which is coupled a cathode-ray signal-reproducing tube 13. The cathode-ray tube 13 is of conventional construction comprising an envelope containing in one end an electron gun constituting, in the order named, a cathode 14 having a heater circuit (not shown), a signal-input or control grid 15, a first anode 16 and a second anode 17. Line-frequency and field-frequency scanning coils 18, 18 and 19, 19, respectively, are disposed about the neck of the tube for deflecting the beam in two directions normal to each other. The video-frequency output of television-signal receiver 10 is connected to the control grid 15. A line-frequency generator 20 and a field-frequency generator 21 are coupled to an output circuit of television-signal receiver 10 for synchronization and serve, in a conventional manner, to supply deflecting currents to coils 18, 18 and 19, 19, respectively. The portions of the circuit just described may all be of conventional well-known construction so that detailed illustrations and descriptions thereof are unnecessary.

Referring briefly to the operation of the system just described, as a whole, television signals intercepted by the antenna 11, 12 are selected, amplified, and detected in television-signal receiver 10. Electrons emitted from cathode 14 are accelerated and focused into a beam by the magnetic lens of the invention, presently to be described. The television-signal receiver 10 also supplies line-frequency and field-frequency synchronizing signals to generators 20 and 21, respectively, to synchronize the operation thereof. Saw-tooth current waves generated by the line-frequency and field-frequency generators 20 and 21, respectively, are supplied to the scanning elements 18, 18 and 19, 19 to produce electric scanning fields, thereby to deflect the ray in two directions normal to each other so as to trace a rectilinear scanning pattern on the screen of the target, thereby to reconstruct the transmitted picture.

Referring now more particularly to the portion of the system of Fig. 3 comprising the present invention, there is shown a magnetic lens which is in all respects the equivalent of the circuit of Fig. 2. The two portions $R_m$, $R_m$ of the main focusing winding have an axis adapted to be disposed generally parallel to the path of the electron beam and are shown separated from each other by the subsidiary focusing winding $R_s$ which is arranged substantially coaxial with the main focusing winding. It will be understood that, in practice, these windings usually are constructed to provide a unitary coaxial structure, the windings being schematically shown separately for the purpose of simplicity. The operation of the magnetic lens of Fig. 3 is identical to that of Fig. 2.

By an obvious modification of the circuit of Fig. 2, the current through the subsidiary winding may be, not the current in the diagonal, but the anode current of a thermionic tube between the control grid and cathode of which the voltage developed across the diagonal is applied. This arrangement is shown diagrammatically in Fig. 4, which is generally similar to that of Fig. 2, and similar circuit elements have been given identical reference numerals. In the circuit of Fig. 4, however, the input electrodes of a vacuum tube 30 are coupled across the diagonal conjugate to the power input diagonal. The subsidiary winding $R_s$ of the magnetic lens of the invention is coupled to the output circuit of vacuum tube 30, and thus is indirectly coupled in the diagonal of the bridge conjugate to that of the power input by means of the latter vacuum tube.

For the circuit of Fig. 4 the condition corresponding to Equation 4 is, $$2n_m . \partial i_m / \partial R + n_s g_a \partial v_g / \partial R = 0 \qquad (6)$$

where $v_g$ is the voltage developed across the diagonal to which the input electrodes of the tube are coupled, assumed to be of infinite resistance, and $g_a$ is the mutual conductance of the tube 30; that is to say, $\partial i_a / \partial v_g$, where $i_a$ is the anode current of tube 30. The advantage of this arrangement is that, since the current in the subsidiary winding $R_s$ may be greater, the number of turns of the subsidiary winding $R_s$ may be less.

That is, in the arrangement of Fig. 4, if the mutual conductance of the tube $g_a$ is so related to the constants of the bridge circuit as to satisfy Equation 6, the resultant field of the lens is substantially independent of changes of the resistance of the main winding $R_m$, $R_m$.

Since ideal tubes are not available, it is difficult to provide an arrangement in accordance with the circuit of Fig. 4 in which both $g_a$ is independent of $v_g$ over the whole of the operating range and the anode current of the tube is zero when $v_g$ is zero, as has been assumed. This difficulty can be overcome by connecting one terminal of the input electrode of tube 30, not to a true diagonal point, but to a tap on one of the bridge arms, as shown in Fig. 5 of the accompanying drawing. The circuit of Fig. 5 is generally similar to that of Fig. 4 and corresponding circuit elements have been given identical reference numerals. The circuit of Fig. 5 differs from that of Fig. 4 only in that the input electrode of vacuum tube 30 is coupled to a tap on arm $S_2$, the input electrodes of vacuum tube 30 thus being connected to derive a portion of the voltage across the arm $S_2$ of the bridge as a bias voltage. The tap can then be chosen so that there is a bias on the tube, when the bridge is balanced, sufficiently negative that the tube yields substantially zero output current and also so that the output current of the tube varies with the unbalance of the bridge very nearly as it would if the input of the tube were across the true diagonal.

In Figs. 4 and 5 the tube 30 is shown for simplicity as a triode. The tube of course may be, and preferably is, a screen grid tube, for example, a pentode.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A magnetic lens system for focusing an electron beam of a cathode-ray tube comprising, a first focusing winding having an axis adapted to be disposed generally parallel to the path of the electron beam, a second focusing winding substantially coaxial with said first winding, a Wheatstone resistance bridge circuit having a diagonal adapted to be coupled to a source of unidirectional potential, at least a portion of said first winding being coupled in an arm of said bridge and said second winding being coupled in the other diagonal of said bridge, the resistances of the arms of said bridge being so proportioned relative to the magnetic fields of said windings that the resultant field produced by both of said windings is substantially independent of changes of resistance of said first focusing winding.

2. A magnetic lens system for focusing an electron beam of a cathode-ray tube comprising, a first focusing winding having an axis adapted to be disposed generally parallel to the path of the electron beam, a second focusing winding substantially coaxial with said first winding, a Wheatstone resistance bridge circuit having a diagonal adapted to be coupled to a source of unidirectional potential, said first winding being coupled in an arm of said bridge, and said second winding being coupled in the other diagonal of said bridge, the resistances of the arms of said bridge being so proportioned relative to the magnetic fields of said windings that the resultant field produced by both of said windings is substantially independent of changes of resistance of said first focusing winding.

3. A magnetic lens system for focusing an electron beam of a cathode-ray tube comprising, a main focusing winding having an axis adapted to be disposed generally parallel to the path of the electron beam, a subsidiary focusing winding substantially coaxial with said main winding, a Wheatstone resistance bridge circuit having a diagonal adapted to be coupled to a source of unidirectional potential, equal portions of said main winding being coupled in two opposite arms of said bridge, and said subsidiary winding being coupled in the other diagonal of said bridge, the resistances of the arms of said bridge being so proportioned to the magnetic fields of said windings that the resultant field produced by both of said windings is substantially independent of changes of resistance of said main focusing winding.

4. A magnetic lens system for focusing an electron beam of a cathode-ray tube comprising, a main focusing winding having an axis adapted to be disposed generally parallel to the path of the electron beam, a subsidiary focusing winding substantially coaxial with said main winding, a Wheatstone resistance bridge circuit having a diagonal adapted to be coupled to a source of unidirectional potential, all portions of said main winding being coupled in two opposite arms of said bridge, and said subsidiary winding being coupled in the other diagonal of said bridge, the resistances of the arms of said bridge being so proportioned relative to the magnetic fields of said windings that the resultant field produced by both of said windings is substantially independent of changes of resistances of said main focusing winding.

5. A magnetic lens system for focusing an electron beam of a cathode-ray tube comprising, a main focusing winding having an axis adapted to be disposed generally parallel to the path of the electron beam, a subsidiary focusing winding substantially coaxial with said main winding, a vacuum tube, a Wheatstone resistance bridge circuit having a diagonal adapted to be coupled to a source of unidirectional potential, at least a portion of said main winding being coupled in an arm of said bridge and said subsidiary winding being coupled in the other diagonal of said bridge by means of said vacuum tube, the resistances of the arms of said bridge being so proportioned relative to the magnetic fields of said windings and the mutual conductance of said vacuum tube that the resultant field produced by both of said windings is substantially independent of changes of resistance of said main focusing winding.

6. A magnetic lens system for focusing an electron beam of a cathode-ray tube comprising, a main focusing winding having an axis adapted to be disposed generally parallel to the path of the electron beam, a subsidiary focusing winding substantially coaxial with said main winding, a vacuum tube comprising input electrodes, a Wheatstone resistance bridge circuit having a diagonal adapted to be coupled to a source of unidirectional potential, at least a portion of said main winding being coupled in an arm of said bridge and said subsidiary winding being effectively coupled in the other diagonal of said bridge by said vacuum tube, said input electrodes being connected to derive a portion of the voltage across one of the arms of said bridge as a bias voltage, said bias voltage being so related to the characteristic of said tube that the output current of said tube is substantially zero when said bridge is balanced, the resistances of the arms of said bridge being so proportioned relative to the magnetic fields of said windings and the mutual conductance of said vacuum tube that the resultant field produced by both of said windings is substantially independent of changes of resistance of said main focusing winding.

7. A magnetic lens system for focusing an electron beam of a cathode-ray tube comprising, a main focusing winding having an axis adapted to be disposed generally parallel to the path of the electron beam, a subsidiary focusing winding substantially coaxial with said main winding, a Wheatstone resistance bridge circuit having a diagonal adapted to be coupled to a source of unidirectional potential, at least a portion of said main winding being coupled in an arm of said bridge and said subsidiary winding being coupled to the other diagonal of said bridge, said bridge circuit being so proportioned that, $$n_m . \partial i_m / \partial R + n_s \partial i_s / \partial R = 0$$

where $n_m$ is a constant determined by the number of turns in the said main winding; $n_s$ is a constant determined by the number of turns in the said subsidiary winding; $\partial i_m / \partial R$ is the rate of change of current in the said main winding with change of resistance of said main winding; $\partial i_s / \partial R$ is the rate of change of current in said subsidiary winding with change of resistance of said subsidiary winding, whereby the resultant field produced by both of said windings is substantially independent of changes of resistance of said main focusing winding.

LLOYD A. W. E. KEMP.